United States Patent
Tamamitsu

[11] Patent Number: 6,166,899
[45] Date of Patent: Dec. 26, 2000

[54] ELECTROLYTE FOR ELECTROLYTIC CAPACITOR AND ELECTROLYTIC CAPACITOR HAVING THE SAME

[75] Inventor: Kenji Tamamitsu, Tokyo, Japan

[73] Assignee: Nippon Chemi-Con Corporation, Tokyo, Japan

[21] Appl. No.: 09/213,435

[22] Filed: Dec. 17, 1998

[30]     Foreign Application Priority Data

| Dec. 18, 1997 | [JP] | Japan | 9-364527 |
| Dec. 25, 1997 | [JP] | Japan | 9-367140 |
| Feb. 18, 1998 | [JP] | Japan | 10-054383 |
| Mar. 13, 1998 | [JP] | Japan | 10-082522 |
| Jul. 31, 1998 | [JP] | Japan | 10-230158 |

[51] Int. Cl.$^7$ ............... H01G 9/02; H01M 6/04
[52] U.S. Cl. ............ 361/504; 361/509; 361/516; 252/62.2
[58] Field of Search ............... 361/500, 502, 361/503, 504, 505, 508, 509, 510, 511, 512, 513, 516, 525, 526, 522, 528, 529, 530, 532; 252/62.2

[56]         References Cited

U.S. PATENT DOCUMENTS

| 4,151,581 | 4/1979  | Bernard et al. | 361/512 |
| 4,715,976 | 12/1987 | Mori et al.    | 252/62.2 |
| 4,821,153 | 4/1989  | Kuwae et al.   | 361/505 |
| 5,616,274 | 4/1997  | Kanabara et al.| 252/62.2 |
| 5,754,394 | 5/1998  | Evans et al.   | 361/516 |
| 5,827,602 | 10/1998 | Koch et al.    | 429/194 |

FOREIGN PATENT DOCUMENTS

| 30 04 728 | 8/1981 | Germany | H01G 9/00 |
| 406132172A | 5/1994 | Japan   | H01G 9/04 |
| 410135081A | 5/1998 | Japan   | H01G 9/035 |

*Primary Examiner*—Kristine Kincaid
*Assistant Examiner*—Eric W. Thomas
*Attorney, Agent, or Firm*—Sughrue, Mion, Zinn, Macpeak & Seas, PLLC

[57]          ABSTRACT

And electrolytic capacitor having excellent high temperature life characteristics and excellent low temperature properties, an aluminum electrolytic capacitor having excellent high temperature life characteristics and moisture resistance, a low dielectric loss and good low temperature properties, and an electrolyte therefor. A first electrolyte which includes a mixed solvent of sulfolane and at least one 3-methyl sulfolane and 2,4-dimethyl sulfolane, a second electrolyte in which a quaternized imidazolinium salt or a quaternized pyrimidinium salt is dissolved in a mixed solvent containing sulfolane and γ-butyrolactone, and a third electrolyte which includes a mixed solvent containing γ-butyrolactone and at least two of sulfolane, 3-methyl sulfolane and 2,4-dimethyl sulfolane and a quaternized imidazolinium salt or a quaternized pyrimidinium. An aluminum electrolytic capacitor constructed by winding, via a separator, an anodic electrode foil provided with an anode leading means and a cathodic electrode foil provided with a cathode leading means made of aluminum to thereby form a capacitor device, and then impregnating the capacitor device with each of the above-specified electrolytes.

4 Claims, 2 Drawing Sheets

ELECTROLYTE FOR ELECTROLYTIC CAPACITOR AND ELECTROLYTIC CAPACITOR HAVING THE SAME

FIELD OF THE INVENTION

This invention relates to an electrolyte for an electrolytic capacitor. More specifically, it relates to an electrolyte for an electrolytic capacitor having excellent high temperature life characteristics, and an electrolytic capacitor comprising the same. More particularly, it relates to an aluminum electrolytic capacitor having excellent high temperature life characteristics and moisture resistance.

BACKGROUND OF THE INVENTION

The general method for producing an electrolytic capacitor comprises winding, via a separator made of Manila paper, etc., an anodic electrode foil (A), which has been obtained by chemically or electrochemically etching a valve metal foil (for example, a band made of highly pure aluminum) to enlarge the foil surface and subjecting this foil to an anodizing treatment in an electrolyte such as an aqueous ammonium borate solution to thereby form an oxide coating layer on its surface, and a cathodic electrode foil (B) made of a highly pure foil subjected to etching treatment only. Next, the obtained capacitor device is impregnated with an electrolyte for driving electrolytic capacitors and putting in a bottomed outer case. The outer case is equipped at the opening with a sealer made of an elastic rubber and sealed by drawing.

The anodic electrode foil and the cathodic electrode foil are each connected to a lead wire by stitching, ultrasonic welding, etc., so as to lead the electrode. The lead wire employed as each electrode leading means is composed of a round bar, a connecting member being in contact with the electrode foil and an outer connecting member made of a solderable metal which has been fixed at the tip of the round bar by welding, etc.

There are various electrolytes, with which capacitor devices are to be impregnated for driving electrolytic capacitors, depending on the performance of the electrolytic capacitor employed. Among them, adipic acid solutions in ethylene glycol are known as electrolytes which are suitable for low voltage and have excellent high temperature life characteristics.

FIGS. 1 and 2 show general structures of aluminum electrolytic capacitors. An aluminum foil of a high purity is chemically or electrochemically etched to thereby enlarge the aluminum foil surface. This aluminum foil is subjected to an anodizing treatment in an electrolyte such as an aqueous ammonium borate solution to give an anodic electrode foil (2) having an oxide coating layer formed on its surface. This anodic electrode foil (2) and a cathodic electrode foil (3) made of an aluminum foil of a high purity having been etched alone, are wound via a separator (11) made of Manila paper, etc., to give a capacitor device (1) as shown in FIG. 2. As FIG. 1 shows, this capacitor device (1) is impregnated with an electrolyte for driving electrolytic capacitors and then put into a bottomed outer case (10) made of aluminum, etc., which is then sealed by drawing.

As FIG. 2 shows, the anodic electrode foil (2) and the cathodic electrode foil (3) are provided respectively with lead wires (4) and (5), which are electrode-leading means, by stitching, welding, etc. The lead wires (4) and (5) each employed as an electrode leading means is composed of a round bar (6) made of aluminum, a connecting member (7) being in contact with the electrode foil (2) or (3) and an outer connecting member (8) made of a solderable metal which has been fixed at the tip of the round bar (6) by welding, etc.

There are various electrolytes, with which the capacitor device (1) is impregnated for driving aluminum electrolytic capacitors, depending on the performance of the aluminum electrolytic capacitor employed. Among them, a solution comprising a quaternary ammonium salt dissolved in γ-butyrolactone is known as an electrolyte having a high electric conductance. In recent years, there are further reported electrolytes wherein γ-butyrolactone is employed as the main solvent and salts composed of quaternized cyclic amidin compounds (imidazolinium cation and imidazolium cation) as the cationic component and acid conjugated bases as the anionic component are dissolved therein as the solute (JP-A-8-321440 and JP-A-8-321441. The term "JP-A" as used herein means an "unexamined published Japanese patent application").

With the recent tendency toward improved automobile functions, it has been more and more required in the field of vehicle equipment to use electronic parts in engine areas operated at high temperatures. However, electrolytic capacitors with the use of the above-mentioned electrolytes cannot withstand these high temperatures. Regarding low temperature characteristics, furthermore, these electrolytic capacitors can withstand a temperature of −25° C. at lowest but vehicle equipment should generally withstand low temperatures of about −40° C. Namely, no electrolyte for electrolytic capacitors usable in this field has been provided in practice so far.

Although sulfolane has been known as a high-boiling solvent capable of imparting excellent high temperature life characteristics (JP-A-1-124210 and JP-A-8-31699), it fails to establish the desired characteristics as described above. Thus, sulfolane cannot be employed in vehicle equipments which should have excellent high temperature life characteristics and low temperature properties simultaneously.

SUMMARY OF THE INVENTION

Accordingly, an object of the present invention is to provide an electrolytic capacitor having excellent high temperature life characteristics and excellent low temperature properties and an electrolyte to be used in these electrolytic capacitors.

Another object of the present invention is to provide an aluminum electrolytic capacitor having excellent high temperature life characteristics and moisture resistance, a low dielectric loss and good low temperature properties.

The above objects are achieved mainly by the following constitutions:

(1) A first electrolyte for electrolytic capacitors comprises a mixed solvent of sulfolane and at least one selected from the group consisting of 3-methyl sulfolane and 2,4-dimethyl sulfolane as a solvent;

the first electrolyte for electrolytic capacitors, wherein the content of sulfolane is from 20 to 70% by weight based on the mixed solvent;

the first electrolyte for electrolytic capacitors, which comprises a quaternized cyclic amidinium salt as a solute; and an electrolytic capacitor, which comprises the first electrolyte, (2) An aluminum electrolytic capacitor constructed by winding, via a separator, an anodic electrode foil provided with an anode leading means and a cathodic electrode foil provided with a cathode leading means made of aluminum to thereby form a capacitor device, and then impregnating said capacitor device with a second electrolyte in which a quaternized imidazolinium salt or a quaternized pyrimidinium salt is dissolved in a mixed solvent containing sulfolane and γ-butyrolactone;

the aluminum electrolytic capacitor, wherein the second electrolyte contains γ-butyrolactone in an amount of from 20 to 60% by weight based on the mixed solvent;

the aluminum electrolytic capacitor, wherein the cathodic electrode foil is an aluminum foil having provided on the whole or part of a surface thereof a coating made of a metal nitride selected from the group consisting of titanium nitride, zirconium nitride, tantalum nitride and niobium nitride or a metal selected from the group consisting of titanium, zirconium, tantalum and niobium; and the aluminum electrolytic capacitor, wherein an aluminum oxide layer is formed by anodic oxidation on the whole or a part of the surface of the cathode leading means, and (3) a third electrolyte for electrolytic capacitors which comprises a mixed solvent containing γ-butyrolactone and at least two selected from the group consisting of sulfolane, 3-methyl sulfolane and 2,4-dimethyl sulfolane as a solvent and a quaternized imidazolinium salt or a quaternized pyrimidinium salt as a solute; and an electrolytic capacitor which comprises the third electrolyte.

DETAILED DESCRIPTION OF THE INVENTION

Figure 1:
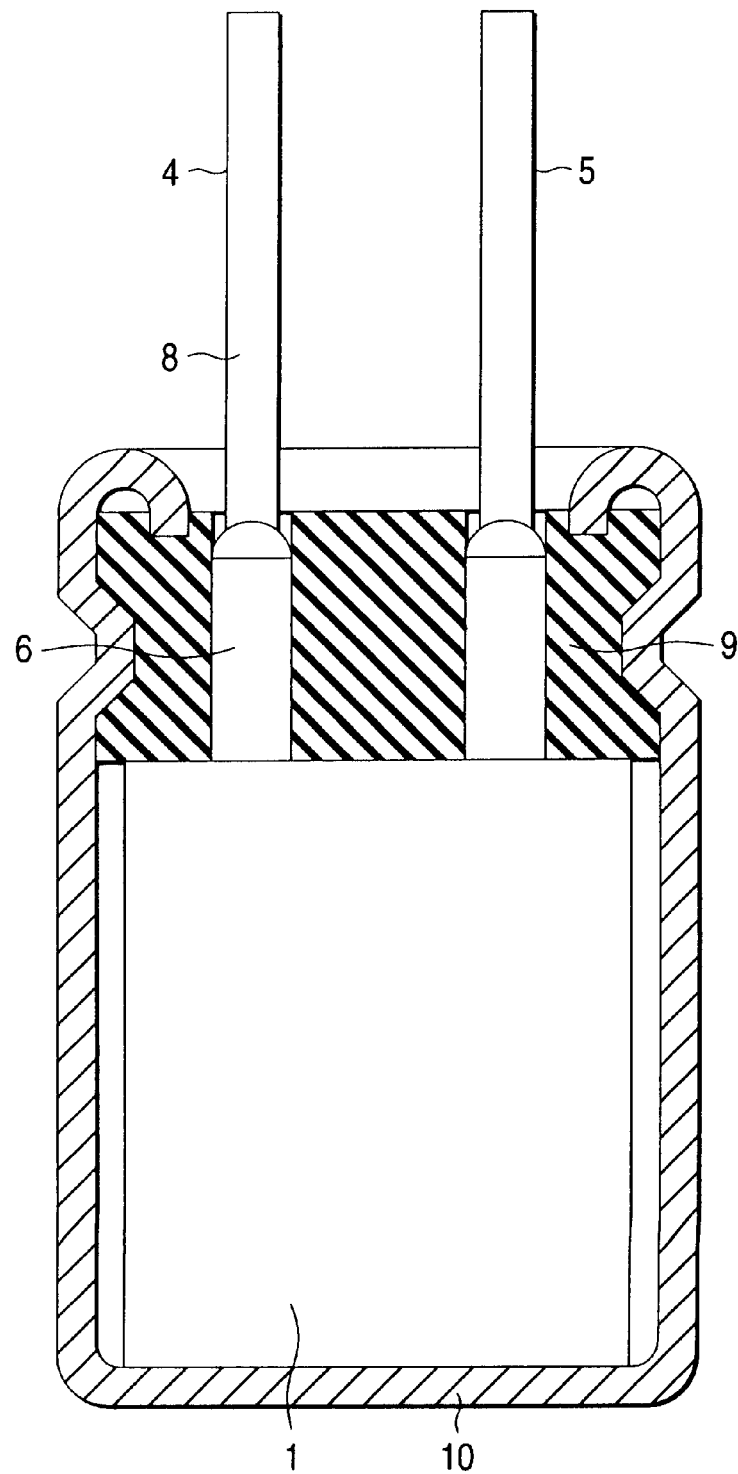
FIG. 1 is an internal sectional view showing the structure of the aluminum electrolytic capacitor.
Figure 2:
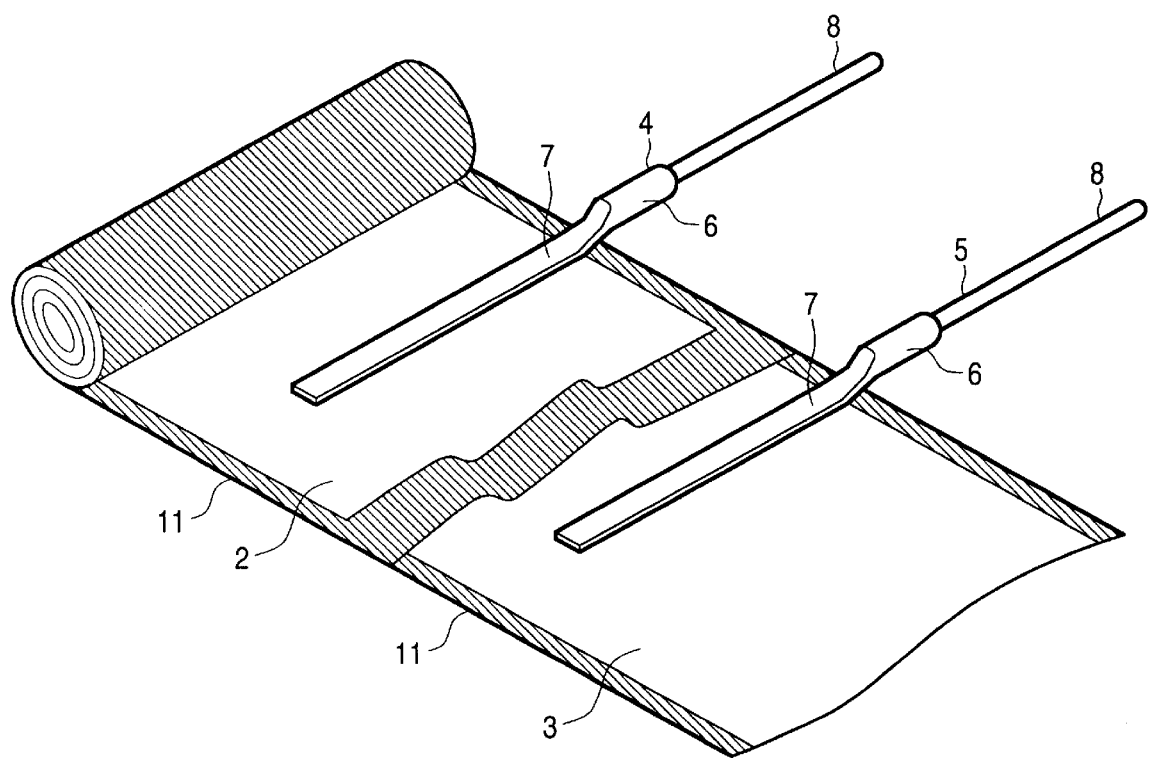
FIG. 2 is a perspective view showing the structure of the capacitor device.

The aluminum electrolytic capacitor of the present invention has the same structure as that of the conventional ones, as shown in FIGS. 1 and 2. A capacitor device (1) is formed by winding an anodic electrode foil (2) and a cathodic electrode foil (3) via a separator (11). As FIG. 2 shows, the anodic electrode foil (2) and the cathodic electrode foil (3) are connected respectively to a lead wire (4) for leading the anode and another lead wire (5) for leading the cathode. These lead wires (4) and (5) are each composed of a connecting member (7) being in contact with the electrode foil, a round bar (6) having been molded integrally with the connecting member (7), and an outer connecting member (8) having been fixed at the tip of the round bar (6). The connecting member (7) and the round bar (6) are each made of highly pure aluminum while the outer connecting member (8) is made of a solder-plated, copper-plated steel wire. These lead wires (4) and (5) are connected respectively to the electrode foils (2) and (3) at the connecting member (7) by stitching, ultrasonic welding, etc.

As the anodic electrode foil (2), use is made of one formed by chemically or electrochemically etching an aluminum foil of a purity of 99% or above in an acidic solution to thereby enlarge the surface area thereof, and then subjecting the aluminum foil to an anodizing treatment in an aqueous solution of ammoniumborate, ammonium phosphate, ammonium adipate, etc., to thereby form an anodic oxidation coating layer on the surface thereof.

The capacitor device (1) thus constructed is then impregnated with an electrolyte for driving electrolytic capacitors.

The capacitor device (1), which has been thus impregnated with the electrolyte, is then put into a bottomed outer case (10) made of aluminum. The outer case (10) is provided at the opening with a sealer (9) and then sealed by drawing. The sealer (9) is made of, for example, an elastic rubber such as butyl rubber having pores through which the lead wires (4) and (5) are to be passed. Solvent The first electrolyte contains sulfolane and one or more selected from 3-methyl sulfolane and 2,4-dimethyl sulfolane as a solvent. The content of sulfolane is preferably from 20 to 70% by weight, more preferably from 50 to 70% by weight, based on the mixed solvent. The total amount of one or more selected from 3-methyl sulfolane and 2,4-dimethyl sulfolane is generally from 30 to 80% by weight, preferably from 30 to 50% by weight, based on the mixed solvent.

The second electrolyte contains a mixed solvent containing sulfolane and γ-butyrolactone as a solvent. The content of sulfolane is preferably from 40 to 80% by weight based on the mixed solvent.

The third electrolyte contains a mixed solvent of γ-butyrolactone and two or more selected from sulfolane, 3-methyl sulfolane, and 2,4-dimethyl sulfolane. The total amount of two or more selected from sulfolane, 3-methyl sulfolane, and 2,4-dimethyl sulfolane is preferably above 80% by weight based on the mixed solvent.

In each electrolyte, the solvent may further contain other solvents.

Examples of the other solvents which may be mixed therewith include protic organic porous solvents such as monohydric alcohols (ethanol, propanol, butanol, pentanol, hexanol, cyclobutanol, cyclopentanol, cyclohexanol, benzyl alcohol, etc.), polyhydric alcohols and oxyalcohol compounds (ethylene glycol, propylene glycol, glycerol, methyl cellosolve, ethyl cellosolve, methoxypropylene glycol, dimethoxypropanol, etc.), aprotic organic porous solvents such as amides (N-methylformamide, N,N-dimethylformamide, N-ethylformamide, N,N-diethylformamide, N-methylacetamide, N,N-dimethylacetamide, N-ethylacetamide, N,N-diethylacetamide, hexamethylphosphoric amide, etc.), lactones (γ-butyrolactone, δ-valerolactone, γ-valerolactone, etc.), cyclic amides (N-methyl-2-pyrrolidone, ethylene carbonate, propylene carbonate, isobutylene carbonate, etc.), nitriles (acetonitrile, etc.), oxides (dimethylsulfoxide, etc.) and 2-imidazolidinones (1,3-dialkyl-2-imidazolidinone, (1,3-dimethyl-2-imidazolidinone, 1,3-diethyl-2-imidazolidinone, 1,3-di(n-propyl)-2-imidazolidinone, etc.), 1,3,4-trialkyl-2-imidazolidinone (1,3,4-trimethyl-2-imidazolidinone, etc.).

Solute

Examples of the solute contained in the first electrolyte include ammonium salts, amine salts, quaternary ammonium salts and quaternized cyclic amidinium salts containing acid conjugated bases as the anionic component which are commonly employed in electrolytes for driving electrolytic capacitors. Examples of the amines contained in the amine salts include primary amines (methylamine, ethylamine, propylamine, butylamine, ethylenediamine, etc.), secondary amines (dimethylamine, diethylamine, dipropylamine, methylethylamine, diphenylamine, etc.) and tertiary amines (trimethylamine, triethylamine, tripropylamine, triphenylamine, 1,8-diazabicyclo(5,4,0)-undecene-7, etc.). Examples of the quaternary ammonium contained in the quaternary ammonium salts include tetraalkylammonium (tetramethylammonium, tetraethylammonium, tetrapropylammonium, tetrabutylammonium, methyltriethylammonium, dimethyldiethylammonium, etc.) and pyridium (1-methylpyridium, 1-ethylpyridium, 1,3-diethylpyridium, etc.). Examples of the cations contained in the quaternary salts of the cyclic amidine compounds include cations obtained by quaternizing the following compounds: imidazole monocyclic compounds (imidazole homologs such as 1-methylimidazole, 1,2-dimethylimidazole, 1,4-dimethyl-2-ethylimidazole and 1-phenylimidazole; oxyalkyl imidazole derivatives such as 1-methyl-2-oxymethylimidazole and 1-methyl-2-oxyethylimidazole; nitro- and amino-imidazole derivatives such as 1-methyl-4(5)-nitroimidazole and 1,2-dimethyl-5(4)-aminoimidazole; benzoimidazole (1-methylbenzoimidazole, 1-methyl-2-benzylbenzoimidazole, etc.); compounds having a 2-imidazoline ring (1-methylimidazoline, 1,2-dimethylimidazoline, 1,2,4-trimethylimidazoline, 1,4-dimethyl-2-ethylimidazoline, 1-methyl-2-phenylimidazoline, etc.); compounds having tetrahydropyrimidine ring (1-methyl-1,4,5,6-tetrahydropyrimidine, 1,2-dimethyl-1,4,5,6-tetrahydropyrimidine, 1,8-diazabicyclo[5,4,0]undecene-7,1, 5-diazabicyclo[4,3,0]nonene-5, etc.).

Examples of the anionic component include conjugated bases of acids such as carboxylic acids (phthalic acid, isophthalic acid, terephthalic acid, maleic acid, benzoic acid, toluic acid, enanthic acid, malonic acid, etc.), phenols, boric acid, phosphoric acid, carbonic acid and silicic acid.

When a quaternized cyclic amidinium salt is used as the solute, the low temperature characteristics can be more improved. Examples of the quaternized cyclic amidinium salt include those wherein a cationic component such as a quaternized imidazolinium or quaternized pyrimidinium is used together with the above-mentioned anionic component. The amount of the quaternized cyclic amidinium salt is preferably from 5 to 40% by weight.

Examples of the quaternized imidazolinium include 1,3-dimethylimidazolinium, 1,2,3-trimethylimidazolinium, 1,2, 3,4-tetramethylimidazolinium, 1-ethyl-3-methylimidazolinium and 1-ethyl-2,3-dimethylimidazolinium.

Examples of the quaternized pyrimidinium include 1,3-dimethyl-4,5,6-trihydropyrimidinium, 1,2,3-trimethyl-4,5, 6-trihydropyrimidinium, 1,2,3,4-tetramethyl-5,6-dihydropyrimidinium, 1-ethyl-3-methyl-4,5,6-trihydropyrimidinium and 1-ethyl-2,3-dimethyl-4,5,6-trihydropyrimidinium.

As the solute in the second electrolyte, use may be made of salts having a conjugatedbase of an acid as the anionic component and a quaternized alkylated imidazoline cation or a quaternized alkylated pyrimidine cation as the cationic component. Examples of the acid for the conjugated base as the anionic component include phthalic acid, isophthalic acid, terephthalic acid, maleic acid, benzoic acid, toluic acid, enanthic acid, malonic acid, phenols, boric acid, phosphoric acid, carbonic acid and silicic acid. Examples of the quaternized imidazoliniums or quaternized pyrimidiniums serving as the cationic component include those as cited above concerning the first electrolyte.

As the solute in the third electrolyte of the present invention, use is made of quaternized imidazolinium salts or quaternized pyrimidinium salts having quaternized imidazolinium or quaternized pyrimidinium as the cationic component. Examples of the anionic component include conjugated bases of acids such as carboxylic ac ids (phthalic acid, isophthalic acid, terephthalic acid, maleic acid, benzoic acid, toluic acid, enanthic acid, malonic acid, etc.), phenols, boric acid, phosphoric acid, carbonic acid and silicic acid. Examples of the quaternized imidazoliniums or quaternized pyrimidiniums serving as the cationic component include those as cited above concerning the first electrolyte.

With respect to the second and third electrolytes, the total amount of the quaternized imidazolinium salts and quaternized pyrimidinium salts is preferably from 5 to 40% by weight.

The first to third electrolytes according to the present invention may further contain boric acid-based compounds such as boric acid, complex compounds of boric acid with polysaccharides (mannitol, sorbitol, etc.), complex compounds of boric acid with polyhydric alcohols (ethylene glycol, glycerol, etc.), surfactants, colloidal silica, etc., to thereby improve the voltage proof.

It is also possible to add various additives thereto in order to lessen leaking current or absorb hydrogen gas. Examples of the additives include aromatic nitro compounds (p-nitrobenzoic acid, p-nitrophenol, etc.), phosphorus compounds (phosphoric acid, phosphorous acid, polyphosphoric acid, acidic phosphate compounds), oxycarboxylic acid compounds, etc.

Aluminum electrolytic capacitors using the first and third electrolytes as described above are excellent in high temperature life characteristics and, further, in low temperature characteristics. When the above-mentioned first electrolyte contains from 20 to 70% of sulfolane in the mixed solvent, still preferable low temperature characteristics can be further improved.

When the above-mentioned third electrolyte contains 20% by weight or less of γ-butyrolactone in the mixed solvent, high temperature life characteristics can be further improved.

Aluminum electrolytic capacitors using the second electrolyte of the present invention are excellent in high temperature life characteristics and moisture resistance. Moreover, these electrolytic capacitors have a low dielectric loss and good low temperature characteristics and suffer from little liquid leakage.

When the second electrolyte as described above contains 60% or less of γ-butyrolactone, the life characteristics can be more improved. When the content thereof is larger than 20% the dielectric loss and the low temperature characteristics are improved. That is to say, excellent high temperature life characteristics, a low dielectric loss and good low temperature characteristics can be achieved, when the content of γ-butyrolactone is from 20 to 60%.

In the conventional electrolytes containing quaternized cyclic amidinium salts such as quaternized imidazolinium salts or quaternized pyrimidinium salts as the solute, γ-butyrolactone is employed as the solvent. However, these electrolytes suffer from a problem that the electrolytes would leak between the sealer (9) and the round bar (6) of the lead wire. In contrast thereto, no liquid leakage is observed in the case of the electrolytes of the present invention. The reason therefor is seemingly as follows.

An electrolyte having a quaternized cyclic amidinium salt dissolved therein would leak in the following manner. Namely, in a conventional electrolytic capacitor, the spontaneous immersion potential of the cathode lead wire (5) is noble as compared with the spontaneous immersion potential of the cathodic electrode foil (3). When a direct current is loaded, therefore, more cathode current passes through the cathode lead wire than through the cathodic electrode foil. When no load is applied, a local cell is formed by the cathode lead wire and the cathode foil and thus a cathode current passes through the cathode lead wire. That is to say, a cathode current passes through the cathode lead wire both in the loaded and unloaded state. As a result, there arises a reduction reaction of the dissolved oxygen or hydrogen ion at the side of the cathode lead wire and hydroxyl ion is formed at the interface between the round bar (6) of the cathode lead wire and the electrolyte and at the interface between the connecting member (7) of the cathode lead wire and the electrolyte.

Then, the hydroxyl ion thus formed by the reduction reaction of the dissolved oxygen or hydrogen ion reacts with a quaternized cyclic amidinium. The quaternized cyclic amidinium undergoes ring-opening to give a secondary amine. Because of being highly volatile and less hygroscopic, it is expected that this secondary amine formed in the space between the round bar and the sealer would quickly volatilize without causing liquid leakage.

When hydroxyl ion is formed, however, γ-butyrolactone employed as the solvent also reacts therewith to give γ-hydroxybutyric acid. That is to say, there is the above-mentioned secondary amine together with this γ-hydroxybutyric acid. Due to the pH value-lowering effect of γ-hydroxybutyric acid, the secondary amine formed by the ring-opening of the quaternized cyclic amidinium undergoes ring-closure to give the quaternized cyclic amidinium salt again. Since the quaternized cyclic amidinium salt thus formed is not volatile but highly hygroscopic, there arises liquid leakage from the space between the round bar of the cathode lead wire and the sealer due to the hygroscopicity of the quaternized cyclic amidinium salt. It is estimated that the liquid leakage proceeds in accordance with the above mechanism based on the analytical data that the leaking liquid is mainly composed of water as the major component and the quaternized cyclic amidinium salt.

In the first electrolyte of the present invention, in contrast thereto, use is made as the solvent of a mixed solvent of sulfolane and at least one member selected from 3-methyl sulfolane and 2,4-dimethyl sulfolane. Since none of 3-methyl sulfolane, 2,4-dimethyl sulfolane and sulfolane reacts with hydroxyl ion, no compound lowering the pH value, as γ-hydroxybutyric acid does, is formed in this case. Thus, the quaternized cyclic amidinium salt is not formed again and the generated secondary amine volatilizes without causing any liquid leakage.

In the second electrolyte of the present invention, use is made as the solvent of a mixed solvent of sulfolane with γ-butyrolactone. In the third electrolyte of the present invention, use is made as the solvent of a mixed solvent of γ-butyrolactone and at least two members selected from among sulfolane, 3-methyl sulfolane and 2,4-dimethyl sulfolane. In these cases, the liquid leakage is prevented too.

Since none of sulfolane, 3-methyl sulfolane and 2,4-dimethyl sulfolane reacts with hydroxyl ion, no compound lowering the pH value, as the above-mentioned one does, is formed in these cases. Even if a substance lowering the pH value such as γ-hydroxybutyric acid is formed from γ-butyrolactone, the effect is weak. Therefore, the amount of the quaternized cyclic amidinium salt regenerated by ring-closure of the secondary amine (formed by the ring-opening of the quaternized cyclic amidinium) is small, and the formed secondary amine volatilizes, whereby liquid leakage is prevented.

When a reverse voltage is applied, a cathode current flows in the anodic side in general. Since the polarization resistance of the anodic foil is extremely higher than that of the cathodic foil, the major part of the cathode current at the anodic side passes through the anode lead wire. In conventional electrolytic capacitors, therefore, it is sometimes observed that liquid leakage from the anode lead wire arises from the early stage in a reverse voltage test. On the other hand, when a reverse voltage is applied to the electrolytic capacitor of the present invention, there arises no liquid leakage. The liquid leakage is inhibited in the reverse voltage test too, seemingly because of the effect of the electrolyte of the present invention similar to the one observed in the cathode side as described above. Namely, the present invention achieves an extremely remarkable effect of preventing liquid leakage.

According to the constitution of the present invention as described above, hydroxyl ion generated around the round bar of the cathode lead wire reacts with the quaternized cyclic amidinium and thus disappears. Therefore, the amount of the quaternized cyclic amidinium generated again is small and the secondary amine thus formed volatilizes. Thus, the liquid leakage is prevented in this case.

When a conventional electrolytic capacitor is allowed to stand in an unloaded state and the cathode lead wire (4) comes into contact with the anode lead wire (5), the anode lead wire forms a local cell together with the cathodic electrode foil (3). As a result, there arises a reduction reaction of the dissolved oxygen or hydrogen ion at the anode lead wire side to thereby give hydroxyl ion. Thus, liquid leakage arises too, as observed at the cathode lead wire part. According to the constitution of the present invention, the electrolyte of the present invention can also prevent this liquid leakage based on the similar mechanism as the one observed at the cathode lead wire part.

Therefore, it is considered that liquid leakage can be prevented in the present invention for the above-mentioned reasons.

As the cathodic electrode foil (3), use can be made of a cathodic electrode foil having formed thereon a coating made of a metal nitride selected from the group consisting of titanium nitride, zirconium nitride, tantalum nitride and niobium nitride or a metal selected from the group consisting of titanium, zirconium, tantalum and niobium by known methods such as metallizing, plating or application. The coating generally has a thickness of 0.01 to 0.5 μm. The cathodic electrode foil may be coated with the metal nitride or metal either on the whole surface or a part of the same, for example, on only one face of the foil. Thus, the spontaneous immersion potential of the cathode foil becomes noble as compared with that of the cathode lead wire and the cathode polarization resistance is lowered. When an overvoltage is applied, the cathode current in the cathode lead wire becomes minor and the formation of hydroxyl ion in the cathode lead wire side is inhibited, which is further appropriate in preventing liquid leakage.

It is possible to form an aluminum oxide layer by anodic oxidation with the use of an aqueous solution of ammonium borate, ammonium phosphate or ammonium adipate or to form an insulating layer such as a ceramic coating layer composed of $Al_2O_3$, $SiO_2$, $ZrO_2$, etc., on the surface of at least the round bar (6) of the lead wires (4) and (5). The thickness of the insulating layer is generally from 2 to 25 μm. In an unloaded state, the area constituting the local cell of the cathode lead wire and the cathode foil is reduced. In a loaded state, the cathode current passing through the cathode lead wire is reduced. In both of these cases, therefore, the formation of hydroxyl ion at the cathode lead wire side is inhibited and the effect of preventing liquid leakage is further improved.

EXAMPLES

Next, Examples of the first electrolyte of the present invention will be given.

Tables 1 and 2 show the composition and specific resistance at 30° C. and −40° C. of the electrolyte for electrolytic capacitors of each Example.

indicates that these electrolytes are usable at −40° C. In contrast, the electrolytes of Comparative Examples 1a to 3a and Prior Example were solidified at −40° C., which indicates that they cannot be employed at −40° C. The electrolyte of Prior Example a showed specific resistance of 9 kΩ-cm at −25° C.

TABLE 1

|  | Composition of Electrolyte (wt. %) | | | | | | Specific Resistance (Ω-cm) | |
| --- | --- | --- | --- | --- | --- | --- | --- | --- |
|  | 3-MSL | SL | EG | EDMIP | TMAP | AAd | 30° C. | −40° C. |
| Example 1a | 65 | 10 (13) | 0 | 25 | 0 | 0 | 323 | 28k |
| Example 2a | 60 | 15 (20) | 0 | 25 | 0 | 0 | 320 | 20k |
| Example 3a | 50 | 25 (33) | 0 | 25 | 0 | 0 | 316 | 15k |
| Example 4a | 37.5 | 37.5 (50) | 0 | 25 | 0 | 0 | 312 | 13k |
| Example 5a | 22.5 | 52.5 (70) | 0 | 25 | 0 | 0 | 296 | 20k |
| Example 6a | 15 | 60 (80) | 0 | 25 | 0 | 0 | 292 | 28k |
| Example 7a | 37.5 | 37.5 (50) | 0 | 0 | 25 | 0 | 420 | 20k |
| Comp. Example 1a | 0 | 75 | 0 | 25 | 0 | 0 | 285 | solidified |
| Comp. Example 2a | 75 | 0 | 0 | 25 | 0 | 0 | 325 | solidified |
| Prior Example a | 0 | 0 | 87 | 0 | 0 | 13 | 320 | solidified |

\* 3-MSL: 3-methyl sulfolane.
SL: sulfolane.
EG: ethylene glycol.
EDMIP: 1-ethyl-2,3-dimethylimidazolinium phthalate.
TMAP: tetramethylammonium phthalate.
AAd: ammonium adipate.
Values in parentheses given in SL: content (wt. %) of sulfolane in mixed solvent.

TABLE 2

|  | Composition of Electrolyte (wt. %) | | | | | | Specific Resistance (Ω-cm) | |
| --- | --- | --- | --- | --- | --- | --- | --- | --- |
|  | 2,4-DMSL | SL | EG | EDMIP | TMAP | AAd | 30° C. | −40° C. |
| Example 9a | 65 | 10 (13) | 0 | 25 | 0 | 0 | 339 | 23k |
| Example 10a | 60 | 15 (20) | 0 | 25 | 0 | 0 | 336 | 18k |
| Example 11a | 50 | 25 (33) | 0 | 25 | 0 | 0 | 330 | 11k |
| Example 12a | 37.5 | 37.5 (50) | 0 | 25 | 0 | 0 | 320 | 10k |
| Example 13a | 22.5 | 52.5 (70) | 0 | 25 | 0 | 0 | 306 | 16k |
| Example 14a | 15 | 60 (80) | 0 | 25 | 0 | 0 | 301 | 22k |
| Example 15a | 37.5 | 37.5 (50) | 0 | 0 | 25 | 0 | 460 | 19k |
| Comp. Example 1a | 0 | 75 | 0 | 25 | 0 | 0 | 285 | solidified |
| Comp. Example 3a | 75 | 0 | 0 | 25 | 0 | 0 | 344 | solidified |
| Prior Example a | 0 | 0 | 87 | 0 | 0 | 13 | 320 | solidified |

\* 2,4-DMSL: 2,4-dimethyl sulfolane.
Values in parentheses given in SL: content (wt. %) of sulfonate in mixed solvent.

In Example 8a, 1 part of p-nitrobenzoic acid and 0.3 parts of phosphoric acid were added to 100 parts of the electrolyte of Example 4a. The electrolyte thus obtained showed a specific resistance of 320 Ω-cm at 30° C. and 14 kΩ-cm at −40° C. In Example 16a, 1 part of p-nitrobenzoic acid and 0.3 parts of phosphoric acid were added to 100 parts of the electrolyte of Example 12a. The electrolyte thus obtained showed a specific resistance of 328 Ω-cm at 30° C. and 11 kΩ-cm at −40° C.

As Tables 1 and 2 clearly show, the electrolytes of Examples 1a to 15a according to the present invention were comparable or superior in specific resistance at 30° C. and −40° C. to the electrolytes of Comparative Examples 1a to 3a with the use of sulfolane, 3-methyl sulfolane or 2,4-dimethyl sulfolane alone and the one of Prior Example with the use of ethylene glycol and ammonium adipate. In particular, the electrolytes of Examples 2a to 5a, 8a, 10a to 13a and 16a showing a sulfolane content of from 20 to 70% sustained low specific resistance even at −40° C., which The electrolytes of Examples 4a and 12a wherein 1-ethyl-2,3-dimethylimidazolinium phthalate was employed as the solute showed lower specific resistances both at 30° C. and −40° C. than those of the electrolytes of Examples 7a and 15a wherein tetramethylammonium phthalate was employed as the solute.

To evaluate the high temperature life characteristics, aluminum electrolytic capacitors were constructed by using the electrolytes of Examples 2a, 5a, 10a and 13a and that of Prior Example a. The rated values of the aluminum electrolytic capacitors employed herein were 16V–47 μF and the case size thereof was 6.3 mm (diameter)×5 mm. The rated voltage was applied onto 25 samples of each electrolytic capacitor at 125° C. and the change in electrostatic capacity (ΔC) and the tangent of loss angle (tanδ) were measured after 2,000 hours and 4,000 hours. Table 3 summarizes the results.

TABLE 3

|  | Initial Characteristics | | 2,000 hrs | | 4,000 hrs | |
| --- | --- | --- | --- | --- | --- | --- |
|  | Cap | tanδ | ΔC | tanδ | ΔC | tanδ |
| Example 2a | 46.1 | 0.13 | −6.0 | 0.18 | −12.1 | 0.30 |
| Example 5a | 46.2 | 0.13 | −5.2 | 0.16 | −9.0 | 0.26 |
| Example 10a | 46.2 | 0.14 | −6.1 | 0.19 | −11.5 | 0.31 |
| Example 13a | 46.5 | 0.13 | −5.4 | 0.17 | −8.9 | 0.28 |
| Prior Example a | 46.9 | 0.12 | −22 | 0.60 | — | — |

* Cap (μF), ΔC (%).

As Table 3 clearly shows, the electrolytic capacitors of Examples 2a, 5a, 10a and 13a were superior in high temperature life characteristics and sustained low initial tan Δ compared with the electrolytic capacitor of Prior Example a. These data ensure that the electrolytic capacitors of the present invention are usable at 125° C. for 4,000 hours.

To evaluate the liquid leakage characteristics, electrolytic capacitors with the use of the electrolytes of Examples 4a and 11a and an electrolytic capacitor (Comparative Example 4a) with the use of an electrolyte comprising 75% by weight of γ-butyrolactone and 25% by weight of 1-ethyl-2,3-dimethylimidazolinium phthalate were constructed. The rated voltage was applied onto 25 samples of each electrolytic capacitor at 85° C. under 85% RH and the occurrence of liquid leakage was monitored with the naked eye after 500, 1,000 and 2,000 hours. Table 4 summarizes the results. Moreover, a reverse voltage of −1.5 V was applied onto 25 samples of each electrolytic capacitor at 85° C. under 85% RH and the occurrence of liquid leakage was monitored with the naked eye after 250, 500and, 1000hours. Table 5 summarizes the results.

TABLE 4

|  | 500 hrs | 1,000 hrs | 2,000 hrs |
| --- | --- | --- | --- |
| Example 4a | 0/25 | 0/25 | 0/25 |
| Example 11a | 0/25 | 0/25 | 0/25 |
| Comp. Example 4a | 0/25 | 10/25 | 25/25 |

TABLE 5

|  | 250 hrs | 500 hrs | 1,000 hrs |
| --- | --- | --- | --- |
| Example 4a | 0/25 | 0/25 | 0/25 |
| Example 11a | 0/25 | 0/25 | 0/25 |
| Comp. Example 4a | 5/25 | 20/25 | 25/25 |

As Table 4 clearly shows, liquid leakage arose after 1,000 hours in the electrolytic capacitor of Comparative Example 4a, while the electrolytic capacitors with the use of the electrolytes of Examples 4a and 11a according to the present invention showed no liquid leakage even after 2,000 hours, thus achieving good results. As Table 5 shows, furthermore, the electrolytic capacitor of Comparative Example 4a suffered from liquid leakage after 250 hours in the reverse voltage test, while those of the present invention were free from any liquid leakage even after 1,000 hours, thus achieving considerably strong effects of preventing liquid leakage. These facts indicate that the electrolytes of the present invention are highly effective in preventing liquid leakage.

As described above, the first electrolyte for electrolytic capacitors contains a mixed solvent of at least one member selected from 3-methyl sulfolane and 2,4-dimethyl sulfolane with sulfolane as the solvent. Electrolytic capacitors with the use of this electrolyte have excellent high temperature life characteristics and good low temperature characteristics. By controlling the content of the sulfolane to 20 to 70% by weight based on the whole solvent, further improved low temperature characteristics can be obtained. By using a quaternized cyclic amidinium salt such as a quaternized imidazolinium salt or a quaternized pyrimidinium salt as the solute, the low temperature characteristics can be further improved. When a quaternized cyclic amidinium salt is used in the electrolyte, no liquid leakage arises.

Next, the electrolytic capacitor containing the second electrolyte of the present invention will be illustrated by reference to Examples. As FIG. 1 shows, a capacitor device is constructed by winding, via a separator (11), an anodic electrode foil (2) and a cathodic electrode foil (3). As FIG. 2 shows, the anodic electrode foil (2) and the cathodic electrode foil (3) are connected respectively to an anode-leading wire (4) and a cathode-leading wire (5).

These lead wires (4) and (5) are each composed of a connecting member (7) being in contact with the electrode foil, a round bar (6) having been molded integrally with the connecting member (7), and an outer connecting member (8) having been fixed at the tip of the round bar (6). The connecting member (7) and the round bar (6) are each made of aluminum having a purity of 99% while the outer connecting member (8) is made of a solder-plated, copper-plated steel wire. These lead wires (4) and (5) are electrically connected respectively to the electrode foils (2) and (3) at the connecting member (7) by stitching, ultrasonic welding, etc.

As the anodic electrode foil (2), use is made of one prepared by chemically or electrochemically etching an aluminum foil of 99.9% purity in an acidic solution to thereby enlarge the area and then subjecting the foil to an anodizing treatment in an aqueous ammonium adipate solution to form an anodic oxidation coating layer thereon. As the cathodic electrode foil (3), use is made of one prepared by etching an aluminum foil of 99.7% purity.

The capacitor device (1) thus constructed is then impregnated with electrolytes for driving aluminum electrolytic capacitors. Table 6 shows the composition and electric conductance at 30° C. and −40° C. of each electrolyte.

TABLE 6

| | Composition of Electrolyte (wt. %) | | | | | Electric Conductance (mS/cm) | |
|---|---|---|---|---|---|---|---|
| | Sulfolane | GBL | EDMIP | TMAP | TEPA | 30° C. | −40° C. |
| Example 1b | 67.5 | 7.5 (10) | 25 | | | 4.2 | 0.05 |
| Example 2b | 60 | 15 (10) | 25 | | | 4.9 | 0.1 |
| Example 3b | 50 | 25 (33) | 25 | | | 6.5 | 0.2 |
| Example 4b | 37.5 | 37.5 (50) | 25 | | | 8.0 | 0.5 |
| Example 5b | 30 | 45 (60) | 25 | | | 8.6 | 0.7 |
| Example 6b | 22.5 | 52.5 (70) | 25 | | | 10.0 | 0.8 |
| Comp. Example 1b | 75 | | 25 | | | 3.3 | solidified |
| Comp. Example 2b | 60 | 15 (20) | | 25 | | 3.1 | solidified |
| Comp. Example 3b | 50 | 25 (33) | | 25 | | 4.5 | 0.1 |
| Comp. Example 4b | 37.5 | 37.5 (53) | | 25 | | 6.1 | 0.3 |
| Comp. Example 5b | 50 | 25 (33) | | | 25 | 2.0 | 0.05 |

* GBL: γ-butyrolactone.
EDMIP: 1-ethyl-2,3-dimethylimidazolinium phthalate.
TMAP: tetramethylammonium phthalate.
TEAP: triethylammonium phthalate.
Values in parentheses given in SL: content (wt. %) of sulfonate in mixed solvent.

As Table 6 clearly shows, the electrolytes of Examples 1b to 6b according to the present invention were superior in electric conductance at 30° C. and −40° C. to the electrolytes of Comparative Examples 2b to 5b using tetramethylammonium phthalate or triethylammonium phthalate as the solute. The electrolytes of Examples 2b to 6b with a γ-butyrolactone content of 20% or above sustained high electric conductance even at −40° C. In contrast, the electrolytes of Comparative Example 1b with the use of sulfolane alone as the solvent solidified at −40° C.

To evaluate the high temperature life characteristics, the capacitor devices (1) were impregnated with the electrolytes of Examples 2b and 6b and that of Prior Example 1b comprising 75% of γ-butyrolactone and 25% 1-ethyl-2,3-dimethylimidazolinium phthalate. Next, these capacitor devices each were put into an outer case (10) which was a bottomed tube made of aluminum. Then, the opening of the outer case (10) was sealed with a sealer (9) by drawing.

The rated values of the aluminum electrolytic capacitors employed thus constructed were 16V–47 μF and the case size thereof was 6.3 mm (diameter)×5 mm. The rated voltage was applied to 25 samples of each of the electrolytic capacitors of Examples 2b and 6b and Prior Example 1b at 125° C. and the change in electrostatic capacity (ΔC) and the tangent of loss angle (tan δ) were measured after 1,000 hours and 2,000 hours. Table 7 summarizes the results.

TABLE 7

| | Initial Characteristics | | 1,000 hrs | | 2,000 hrs | |
|---|---|---|---|---|---|---|
| | Cap | tanδ | ΔC | tanδ | ΔC | tanδ |
| Example 2b | 46.0 | 0.09 | −8.3 | 0.11 | −13.3 | 0.18 |
| Example 6b | 46.3 | 0.08 | −14.5 | 0.18 | −26.6 | 0.35 |
| Prior Example 1b | 46.5 | 0.07 | −43.3 | 1.05 | — | — |

* Cap (μF), ΔC (%), LC (μA).

As Table 7 clearly shows, the electrolytic capacitors of Examples 2b and 6b were superior in high temperature life characteristics and sustained low initial tan Δ compared with the electrolytic capacitor of Prior Example lb. with the use of γ-butyrolactone alone as the solvent. In particular, the electrolytic capacitor of Example 2b the γ-butyrolactone content of which in the solvent fell within the range of from 20 to 60% sustained the characteristics at 125° C. for 2,000 hours. In contrast thereto, the electrolytic capacitor of Example 6b suffered from deterioration in its characteristics after 2,000 hours.

To evaluate the moisture resistance, electrolytes were prepared by adding 6% water to the electrolytes of Example 2b and Prior Example 1b to give the electrolytes of Example 7b and Comparative Example 6b, respectively. Then electrolytic capacitors were constructed by the same method as the one described above. 25 samples of each of these electrolytic capacitors were allowed to stand at 125° C. and the change in electrostatic capacity (ΔC), the tangent of loss angle (tan δ) and leaking current (LC) were measured after 1,000 hours and 2,000 hours. Table 8 summarizes the results.

TABLE 8

| | Initial Characteristics | | | 1,000 hrs | | | 2,000 hrs | | |
|---|---|---|---|---|---|---|---|---|---|
| | Cap | tan | LC | ΔC | tan | LC | ΔC | tan | LC |
| Example 7b | 46.3 | 0.08 | 0.3 | −12.0 | 0.15 | 2.8 | −21.4 | 0.26 | 4.3 |
| Comp. Ex. 6b | 46.6 | 0.06 | 0.3 | −83.0 | 3.8 | 36.3 | — | — | — |

* Cap (μF), ΔC (%), LC (μA).

As Table 8 clearly shows, the electrolyte of Example 7b obtained by adding 6% water to the electrolyte of the present invention was superior in all of the items examined (i.e., change in electrostatic capacity, tangent of loss angle and leaking current) to the electrolyte of Comparative Example 6b prepared by adding 6% water to the prior electrolyte, which indicates that the electrolytic capacitor of the present invention has improved moisture resistance.

To evaluate the liquid leakage characteristics, an electrolytic capacitor was constructed in the same manner as in Example 2b except for coating the whole surface of the cathodic electrode foil (3) with titanium nitride by a vacuum evaporation method (Example 8b).

Furthermore, another electrolytic capacitor was constructed in the same manner as in Example 8b except for using an cathodic electrode foil in which an aluminum oxide layer had been formed at least on the surface of the round bar (6) of the lead wires (4) and (5) by anodic oxidation with the use of an aqueous solution of ammonium phosphate (Example 9b).

Onto 25 samples of each of the electrolytic capacitors of the above-mentioned Examples 2b, 8b and 9b and another electrolytic capacitor (Prior Example 2b) with the use of an electrolyte comprising 75% of γ-butyrolactone and 25% of tetramethylammonium phthalate and another electrolytic capacitor (Prior Example 3b) with the use of an electrolyte comprising 75% of γ-butyrolactone and 25% of 1-ethyl-2, 3-dimethylimidazolinium phthalate, the rated voltage was applied at 125° C. and the occurrence of liquid leakage was monitored with the naked eye after 1,500, 3,000 and 5,000 hours. Table 9 summarizes the results.

TABLE 9

|  | 1,500 hrs | 3,000 hrs | 5,000 hrs |
| --- | --- | --- | --- |
| Example 2b | 0/25 | 15/25 | 25/25 |
| Example 8b | 0/25 | 0/25 | 2/25 |
| Example 9b | 0/25 | 0/25 | 0/25 |
| Prior Example 2b | 25/25 | — | — |
| Prior Example 3b | 25/25 | — | — |

As Table 9 clearly shows, the electrolytic capacitor of Example 2b using the electrolyte according to the present invention showed no liquid leakage after 1,500 hours and, therefore, was superior to the electrolytic capacitors of Prior Examples 2b and 3b. The electrolytic capacitor of Example 2b achieved good results at 125° C. too. The electrolytic capacitor of Example 8b, wherein the electrolyte of Example 2b was employed and the whole surface of the cathodic electrode foil had been coated with titanium nitride, showed less liquid leakage. Furthermore, the electrolytic capacitor of Example 9b, wherein an aluminumoxide layer had been formed on the surface of the round bar of the lead wire in the electrolytic capacitor of Example 8b, showed less liquid leakage.

Moreover, a reverse voltage of −1.5 V was applied onto 25 samples of each of the electrolytic capacitors with the use of the electrolytes of Examples 2b, 8b and 9b and Prior Examples 2b and 3b at 85° C. under 85% RH and the occurrence of liquid leakage was monitored with the naked eye after 250, 500 and 1,000 hours. Table 10 summarizes the results.

TABLE 10

|  | 250 hrs | 500 hrs | 1,000 hrs |
| --- | --- | --- | --- |
| Example 2b | 0/25 | 0/25 | 0/25 |
| Example 8b | 0/25 | 0/25 | 0/25 |
| Example 9b | 0/25 | 0/25 | 0/25 |
| Prior Example 2b | 15/25 | 25/25 | — |
| Prior Example 3b | 5/25 | 20/25 | 25/25 |

As Table 10 clearly shows, liquid leakage arose in the electrolytic capacitors of Prior Examples 2b and 3b after 250 hours and all samples suffered from liquid leakage after 500 and 1,000 hours in the reverse voltage test. On the other hand, the electrolytic capacitors according to the present invention showed no liquid leakage even after 1,000 hours, thus achieving good results. As described above, the electrolytic capacitors of the present invention provide an excellent effect of preventing liquid leakage.

As described above, the present invention provides an aluminum electrolytic capacitor constructed by winding, via a separator, an anodic electrode foil provided with an anode leading means and a cathodic electrode foil provided with a cathode leading means made of aluminum to form a capacitor device, then impregnating the capacitor device with an electrolyte wherein a quaternized imidazolinium salt or a quaternized pyrimidinium salt is dissolved as the solute in a mixed solvent containing sulfolane and γ-butyrolactone, and then putting the thus impregnated capacitor device in an outer case.

This electrolytic capacitor is excellent in high temperature life characteristics and moisture resistance. It is also excellent in dielectric loss and low temperature characteristics and suffers from little liquid leakage. By controlling the content of γ-butyrolactone in the mixed solvent in the above-mentioned electrolyte to 20 to 60% by weight based on the whole solvent, it is possible to obtain further improved high temperature life characteristics, lower dielectric loss and better low temperature characteristics. The liquid leakage can be further improved by using an aluminum foil provided with a coating made of a metal nitride selected from the group consisting of titanium nitride, zirconium nitride, tantalum nitride and niobium nitride or a metal selected from the group consisting of titanium, zirconium, tantalum and niobium formed on the whole surface or a part of the same. The liquid leakage characteristics can be further improved by further forming an aluminum oxide layer on the whole surface or a part of the same of the cathode leading means by anodic oxidation.

Next, the third electrolyte of the present invention will be illustrated by reference to Examples. Tables 11 to 13 show the composition and specific resistance at 30° C. and −40° C. of the electrolyte for electrolytic capacitors of each Example according to the present invention.

TABLE 11

| | Composition of Electrolyte (wt. %) | | | | | Specific Resistance (Ω-cm) | |
|---|---|---|---|---|---|---|---|
| | SL | 3-MSL | GBL | EDMIP | TMAP | 30° C. | −40° C. |
| Example 1c | 63 | 7 | 5 (7) | 25 | 0 | 260 | 24k |
| Example 2c | 7 | 63 | 5 (7) | 25 | 0 | 276 | 18k |
| Example 3c | 58.5 | 6.5 | 10 (14) | 25 | 0 | 232 | 15k |
| Example 4c | 32.5 | 32.5 | 10 (14) | 25 | 0 | 242 | 9.5k |
| Example 5c | 6.5 | 58.5 | 10 (14) | 25 | 0 | 250 | 11k |
| Example 6c | 54 | 6 | 15 (20) | 25 | 0 | 207 | 10k |
| Example 7c | 6 | 54 | 15 (20) | 25 | 0 | 223 | 8.8k |
| Example 8c | 28.5 | 28.5 | 18 (24) | 25 | 0 | 213 | 6.9k |
| Comp. Example 1c | 32.5 | 32.5 | 10 (14) | 0 | 25 | 295 | 13k |
| Comp. Example 4c | 75 | 0 | 0 | 25 | 0 | 285 | solidified |
| Comp. Example 5c | 0 | 75 | 0 | 25 | 0 | 325 | solidified |

* SL: sulfolane.
3-MSL: 3-methyl sulfolane.
GBL: γ-butyrolactone.
EDMIP: 1-ethyl-2, 3-dimethylimidazolinium phthalate.
TMAP: tetramethylammonium phthalate.
Values in parentheses given in GBL: content (wt. %) of γ-butyrolactone in mixed solvent.

TABLE 12

| | Composition of Electrolyte (wt. %) | | | | | Specific Resistance (Ω-cm) | |
|---|---|---|---|---|---|---|---|
| | SL | 2,4-DMSL | GBL | EDMIP | TMAP | 30° C. | −40° C. |
| Example 10c | 63 | 7 | 5 (7) | 25 | 0 | 268 | 22k |
| Example 11c | 7 | 63 | 5 (7) | 25 | 0 | 290 | 17k |
| Example 12c | 58.5 | 6.5 | 10 (14) | 25 | 0 | 255 | 14k |
| Example 13c | 32.5 | 32.5 | 10 (14) | 25 | 0 | 262 | 9.0k |
| Example 14c | 6.5 | 58.5 | 10 (14) | 25 | 0 | 269 | 11k |
| Example 15c | 54 | 6 | 15 (20) | 25 | 0 | 219 | 9.5k |
| Example 16c | 6 | 54 | 15 (20) | 25 | 0 | 238 | 8.5k |
| Example 17c | 28.5 | 28.5 | 18 (24) | 25 | 0 | 225 | 6.7k |
| Comp. Example 2c | 32.5 | 32.5 | 10 (14) | 0 | 25 | 318 | 13k |
| Comp. Example 6c | 0 | 75 | 0 | 25 | 0 | 344 | solidified |

* 2,4-DMSL: 2,4-dimethyl sulfolane.

TABLE 13

| | Composition of Electrolyte (wt. %) | | | | | Specific Resistance (Ω-cm) | |
|---|---|---|---|---|---|---|---|
| | 3-MSL | 2,4-DMSL | GBL | EDMIP | TMAP | 30° C. | −40° C. |
| Example 19c | 63 | 7 | 5 (7) | 25 | 0 | 280 | 21k |
| Example 20c | 7 | 63 | 5 (7) | 25 | 0 | 303 | 16k |
| Example 21c | 58.5 | 6.5 | 10 (14) | 25 | 0 | 270 | 14k |
| Example 22c | 32.5 | 32.5 | 10 (14) | 25 | 0 | 278 | 8.3k |
| Example 23c | 6.5 | 58.5 | 10 (14) | 25 | 0 | 285 | 12k |
| Example 24c | 54 | 6 | 15 (20) | 25 | 0 | 229 | 9.5k |
| Example 25c | 6 | 54 | 15 (20) | 25 | 0 | 248 | 8.6k |
| Example 26c | 28.5 | 28.5 | 18 (24) | 25 | 0 | 234 | 7.0k |
| Comp. Example 3c | 32.5 | 32.5 | 10 (14) | 0 | 25 | 348 | 13k |

In Example 9c, 1 part of p-nitrobenzoic acid and 0.3 parts of phosphoric acid were added to 100 parts of the electrolyte of Example 4c. The electrolyte thus obtained showed a specific resistance of 246 Ω-cm at 30° C. and 9.6 kΩ-cm at −40° C.

In Example 18c, 1 part of p-nitrobenzoic acid and 0.3 parts of phosphoric acid were added to 100 parts of the electrolyte of Example 13c. The electrolyte thus obtained showed a specific resistance of 268 Ω-cm at 30° C. and 9.2 kΩ-cm at −40° C.

In Example 27c, 1 part of p-nitrobenzoic acid and 0.3 parts of phosphoric acid were added to 100 parts of the electrolyte of Example 22c. The electrolyte thus obtained showed a specific resistance of 282 Ω-cm at 30° C. and 8.5 kΩ-cm at −40° C.

In Prior Example c, 13% by weight of ammonium adipate was dissolved in 87% by weight of ethylene glycol. The electrolyte thus obtained showed a specific resistance of 320 Ω-cm at 30° C. and was solidified at −40° C.

As Tables 11 to 13 clearly show, the electrolytes of Examples 1c to 30c according to the present invention were excellent in specific resistance at 30° C. and −40° C. In particular, they maintained good specific resistance even at −40° C., which indicates that they are usable at −40° C. In contrast, the electrolyte of Prior Example c could not be employed at −40° C. because of solidification. The electrolyte of Prior Example c showed a specific resistance of 9 kΩ-cm at −25° C.

The electrolytes of Examples 4c, 13c and 22c with the use of 1-ethyl-2,3-dimethylimidazolinium phthalate as the solute sustained a low specific resistance compared with those of Comparative Examples 1c, 2c and 3c with the use of tetramethylammonium phthalate both at 30° C. and −40° C. The electrolytes of Comparative Examples 4c, 5c and 6c with the use of sulfolane, 3-methyl sulfolane or 2,4-dimethyl sulfolane alone were solidified even at −25° C, which indicates that these solvents are unusable in electrolytes for electrolytic capacitors.

To evaluate the high temperature life characteristics, aluminum electrolytic capacitors were constructed by using the electrolytes of Examples 2c, 4c, 8c, 11c, 13c, 17c, 20c, 22c and 26c and that of Prior Example c. The rated values of the aluminum electrolytic capacitors employed thus constructed were 16V–47 μF and the case size thereof was 6.3 mm (diameter)×5 mm. The rated voltage was applied to 25 samples of each of the electrolytic capacitors at 125° C. and the change in electrostatic capacity (ΔC) and the tangent of loss angle (tan δ) were measured after 2,000 hours and 4,000 hours. Table 14 summarizes the results.

TABLE 14

| | Initial Characteristics | | 2,000 hrs | | 4,000 hrs | |
|---|---|---|---|---|---|---|
| | Cap | tanδ | ΔC | tanδ | ΔC | tanδ |
| Example 2c | 46.2 | 0.12 | −6.0 | 0.18 | −12.1 | 0.27 |
| Example 4c | 46.3 | 0.11 | −8.1 | 0.19 | −18.0 | 0.33 |
| Example 8c | 46.3 | 0.10 | −14.1 | 0.20 | −26.5 | 0.40 |
| Example 11C | 46.1 | 0.13 | −6.4 | 0.19 | −12.8 | 0.29 |
| Example 13c | 46.3 | 0.12 | −8.6 | 0.22 | −19.0 | 0.35 |
| Example 17c | 46.2 | 0.10 | −15.2 | 0.24 | −30.1 | 0.45 |
| Example 20c | 46.3 | 0.13 | −7.1 | 0.19 | −14.2 | 0.29 |
| Example 22c | 46.2 | 0.12 | −9.2 | 0.24 | −19.9 | 0.39 |
| Example 26c | 46.4 | 0.11 | −15.8 | 0.26 | −31.5 | 0.46 |
| Prior Example c | 46.9 | 0.12 | −22 | 0.60 | — | — |

* Cap (μF), ΔC (%), LC(μA).

As Table 14 clearly shows, the electrolytic capacitors of the Examples were superior in high temperature life characteristics and sustained low initial tan δ compared with the electrolytic capacitor of Prior Example c. Thus, the electrolytic capacitors according to the present invention are usable at 125° C. for 4,000 hours. In particular, the electrolytic capacitors of Examples 2c, 4c, 11c, 13c, 20c and 22c containing 20% by weight or less of γ-butyrolactone sustained excellent characteristics after 4,000 hours.

To evaluate the liquid leakage characteristics, electrolytic capacitors were constructed by using the electrolytes of Examples 4c, 13c and 22c and Comparative Examples 1c to 3c and another comparative electrolyte (Comparative Example 7c) comprising 75% by weight of γ-butyrolactone and 25% by weight of 1-ethyl-2,3-dimethylimidazolinium phthalate. To 25 samples of each of these electrolytic capacitors, the rated voltage was applied at 85° C. under 85% RH and the occurrence of liquid leakage was monitored with the naked eye after 500, 1,000 and 2,000 hours. Table 15 shows the results. Moreover, a reverse voltage of −1.5 V was applied to 25 samples of each of the electrolytic capacitors of Examples 4c, 13c and 22c, and Comparative Example 7c at 85° C. under 85% RH and the occurrence of liquid leakage was monitored with the naked eye after 250, 500 and 1,000 hours. Table 16 summarizes the results.

TABLE 15

| | 500 hrs | 1,000 hrs | 2,000 hrs |
|---|---|---|---|
| Example 4c | 0/25 | 0/25 | 0/25 |
| Example 13c | 0/25 | 0/25 | 0/25 |
| Example 22c | 0/25 | 0/25 | 0/25 |
| Comp. Example 1c | 8/25 | 25/25 | — |
| Comp. Example 2c | 10/25 | 25/25 | — |
| Comp. Example 3c | 11/25 | 25/25 | — |
| Comp. Example 7c | 0/25 | 10/25 | 25/25 |

TABLE 16

| | 250 hrs | 500 hrs | 1,000 hrs |
|---|---|---|---|
| Example 4c | 0/25 | 0/25 | 0/25 |
| Example 13c | 0/25 | 0/25 | 0/25 |
| Example 22c | 0/25 | 0/25 | 0/25 |
| Comp. Example 7c | 5/25 | 20/25 | 25/25 |

As Table 15 clearly shows, the electrolytic capacitors of Comparative Examples 1c to 3c using quaternary ammonium salts suffered from liquid leakage after 500 hours, while the one of Comparative Example 7c with the use of γ-butyrolactone as the solvent suffered from liquid leakage after 1,000 hours. In contrast, the electrolytic capacitors using the electrolytes of the present invention of Examples 4c, 13c and 22c showed no liquid leakage even after 2,000 hours, thus achieving favorable results. In the reverse voltage test, as Table 16 clearly shows, the electrolytic capacitor of Comparative Example 7c suffered from liquid leakage after 250 hours, while those of the present invention showed no liquid leakage even after 1,000 hours, thus showing a highly remarkable effect of preventing liquid leakage. Thus, it can be understood that the electrolytes of the present invention are effective in preventing liquid leakage.

As described above, the third electrolyte for electrolytic capacitors according to the present invention is one wherein a mixed solvent of at least two members selected from sulfolane, 3-methyl sulfolane and 2,4-dimethyl sulfolane with γ-butyrolactone is used as the solvent and a quaternized imidazolinium salt or a quaternized pyrimidinium salt is used as the solute.

The electrolytic capacitor with the use of this electrolyte is excellent in high temperature life characteristics and low temperature characteristics. In the above-mentioned electrolyte, further improved high temperature life characteristics can be obtained by controlling the content of γ-butyrolactone in the mixed solvent to 20% by weight or less based on the whole solvent. Moreover, the electrolytic capacitor of the present invention is free from liquid leakage.

While the invention has been described in detail and with reference to specific embodiments thereof, it will be apparent to one skilled in the art that various changes and modifications can be made therein without departing from the spirit and scope thereof.

What is claimed is:

1. An aluminum electrolytic capacitor constructed by winding, via a separator, an anodic electrode foil provided with an anode leading means and a cathodic electrode foil provided with a cathode leading means made of aluminum to thereby form a capacitor device, and then impregnating said capacitor device with an electrolyte in which a quaternized imidazolinium salt or a quaternized pyrimidinium salt is dissolved in a mixed solvent containing sulfolane and γ-butyrolactone.

2. The aluminum electrolytic capacitor of claim 1, wherein the content of γ-butyrolactone is from 20 to 60% by weight based on the mixed solvent.

3. The aluminum electrolytic capacitor of claim 1, wherein the cathodic electrode foil is an aluminum foil having provided on the whole or part of a surface thereof a coating made of a metal nitride selected from the group consisting of titanium nitride, zirconium nitride, tantalum nitride and niobium nitride or a metal selected from the group consisting of titanium, zirconium, tantalum and niobium.

4. The aluminum electrolytic capacitor of claim 1, wherein an aluminum oxide layer is formed by anodic oxidation on the whole or a part of the surface of the cathode leading means.

\* \* \* \* \*